United States Patent [19]
Pokorney et al.

[11] Patent Number: 5,988,839
[45] Date of Patent: Nov. 23, 1999

[54] REAR FACING LIGHT BAR

[75] Inventors: William J. Pokorney, Haddam; John F. Olson; Jon H. Lyons, both of Deep River; Robert B. Ford, Cromwell, all of Conn.

[73] Assignee: Whelen Engineering Company, Inc., Chester, Conn.

[21] Appl. No.: 09/132,126

[22] Filed: Aug. 17, 1998

[51] Int. Cl.⁶ ........................................................ B60Q 1/00
[52] U.S. Cl. ............................ 362/493; 362/503; 362/540; 362/544
[58] Field of Search ............................................ 362/493, 540, 362/541, 542, 544, 503; 340/468, 472

[56] References Cited

U.S. PATENT DOCUMENTS

| | | | |
|---|---|---|---|
| 4,620,268 | 10/1986 | Ferenc | 362/517 |
| 5,010,319 | 4/1991 | Killinger | 362/493 X |
| 5,027,260 | 6/1991 | Lyons et al. | 362/542 |
| 5,560,701 | 10/1996 | Payne | 362/493 |
| 5,660,457 | 8/1997 | Lyons | 362/494 |

*Primary Examiner*—Stephen Husar
*Attorney, Agent, or Firm*—Alix, Yale & Ristas, LLP

[57] ABSTRACT

A rear facing light bar for a passenger vehicle comprises a housing shaped to define a rearwardly directed roof extension which increases in depth in the downstream direction. The housing is permanently attached to the vehicle and supports, behind an outer lens, a linear array of individually controllable lights which are rearwardly directed.

22 Claims, 4 Drawing Sheets

REAR FACING LIGHT BAR

BACKGROUND OF THE INVENTION

1. Field of the Invention

The present invention relates to the provision of a visual warning of the presence of a public safety vehicle to traffic which is following or overtaking that vehicle and, particularly, to improvements in and to warning light systems for employment on emergency vehicles. More specifically, this invention is directed to a rear-facing light bar, which spans substantially the entire width of a vehicle and includes a plurality of individually controllable light sources, and especially to a light bar which does not significantly increase the overall height or wind resistance of a vehicle on which it is installed. Accordingly, the general objects of the present invention are to provide novel and improved methods and apparatus of such character.

2. Description of the Prior Art

Attention attracting systems for increasing the visibility of police and other public service vehicles have long been known in the art. The most widely employed type of emergency vehicle visual warning system is the light bar. A typical light bar, as exemplified by the disclosures of U.S. Pat. Nos. 4,620,268 and 5,027,260, includes a plurality of light generators arranged on a support which spans from side-to-side, and either rests on or is spaced slightly above, the roof of the emergency vehicle. Light bars have the desirable ability to produce a wide variety of highly visible light radiation patterns. A light bar, however, possesses certain inherent disadvantages. Firstly, prior art light bars increase vehicle wind resistance and thus increase fuel consumption. Also, because of the turbulence created thereby, a conventional light bar will cause at least some increase in the ambient noise level and will thus have a negative effect on communications. Further, a light bar will increase vehicle height and this, in turn, may limit access to certain areas and/or present the possibility of damage to the light bar or property in situations where there is reduced overhead clearance. Perhaps most importantly, a light bar is a conspicuous addition to a vehicle and there are many situations where a law enforcement official does not wish his or her presence to be "announced" by a roof-mounted object, i.e., a light bar, when the warning lights on the vehicle are not energized.

The warning lights on an emergency vehicle, when energized, must unambiguously convey knowledge of the presence of that vehicle to on-coming traffic, to traffic being overtaken, to traffic approaching from the side at an intersection and to traffic which is following and/or overtaking the emergency vehicle, particularly when it is stopped. A light bar, because of its ability to project pulses of light which are directed forwardly, rearwardly and to the side of the vehicle on which it is installed, provides all of the necessary directional warnings. However, the warning of on-coming traffic and traffic which is being overtaken, as well as the warning of traffic which is moving at an acute or right angle to the path of an emergency vehicle, can be effectively accomplished by various combinations of grill or bumper mounted warning lights, headlight flashers, warning lights mounted inside the vehicle on the dash board, sun visors or rear-vision mirror and warning lights integrated with the externally mounted rear view mirrors such as disclosed in U.S. Pat. No. 5,660,457.

It is well known that traffic which is overtaking an emergency vehicle, particularly when the emergency vehicle is stationary, presents the greatest danger for a collision. Tail/back-up light flashers and rear bumper mounted warning lights, in part because such lights are located relatively close to the ground, do not provide as effective a warning to such overtaking traffic as is afforded by a conventional roof-mounted light bar. Additionally, such individual lights, even when operated in combination, do not have either the attention-attracting capability of or the ability to convey directional information possessed by a light bar which may house eight or more separately controllable high intensity light generators.

To summarize the foregoing discussion, there has been an unsatisfied demand for a rear-facing warning light system which would possess all of the advantages of the conventional light bar without the above-discussed disadvantages thereof.

SUMMARY OF THE INVENTION

The present invention satisfies the above-discussed demand by providing a rear-facing, under roof-line light bar. A light bar in accordance with the invention comprises a unitary housing, aerodynamically shaped to fit on a particular vehicle, which has an open bottom. This housing supports a single tier array of rear-facing, individually controllable, light generators which may be energized to create any desired illumination pattern. The light generators are recessed in the housing, i.e., the housing defines an awning, whereby the visibility of the light generators when operating is enhanced. A light bar in accordance with the invention further comprises a smooth surfaced outer lens which covers all of the individual light generators of the array. The lens is designed for easy cleaning whereby the high degree of visibility of the warning provided by the light bar can easily be maintained during vehicle operation under all environmental conditions.

In the typical installation, a light bar in accordance with the present invention will be secured to both the vehicle roof and rear window, i.e., the light bar will partly overlie the vehicle rear window. When installed, rather than increasing the overall height of the vehicle on which mounted, the light bar of the invention defines a substantially smooth rearward extension of the vehicle roof, this extension intercepting the roof line at a point disposed rearwardly from the region where the height of the vehicle reaches its maximum. Thus, a light bar in accordance with the invention, does not increase overall vehicle height, has only minimal effect on the ambient noise level and is not visible to traffic in front of the vehicle or travelling in the opposite direction. However, because of its comparatively high location relative to the ground and its employment of an array of separately energizable lights which spans substantially the entire width of the vehicle, the present light bar provides an extremely effective means of signaling following or overtaking vehicles.

A preferred embodiment of a light bar in accordance with the present invention further includes, mounted in each of the oppositely disposed sides thereof, an alley light which provides an angularly skewed radiation pattern. The design and mounting of these alley lights enables them to provide substantially the same field of illumination as achieved through the use of the side-facing lights which have, in the past, been provided in the ends of conventional light bars mounted approximately midway along the length of an emergency vehicle.

BRIEF DESCRIPTION OF THE DRAWING

The present invention may be better understood and its numerous objects and advantages will become apparent to those skilled in the art, by reference to the accompanying drawings wherein like reference numerals refer to like elements in the several figures and in which.

DESCRIPTION OF THE DISCLOSED EMBODIMENT

Figure 1:
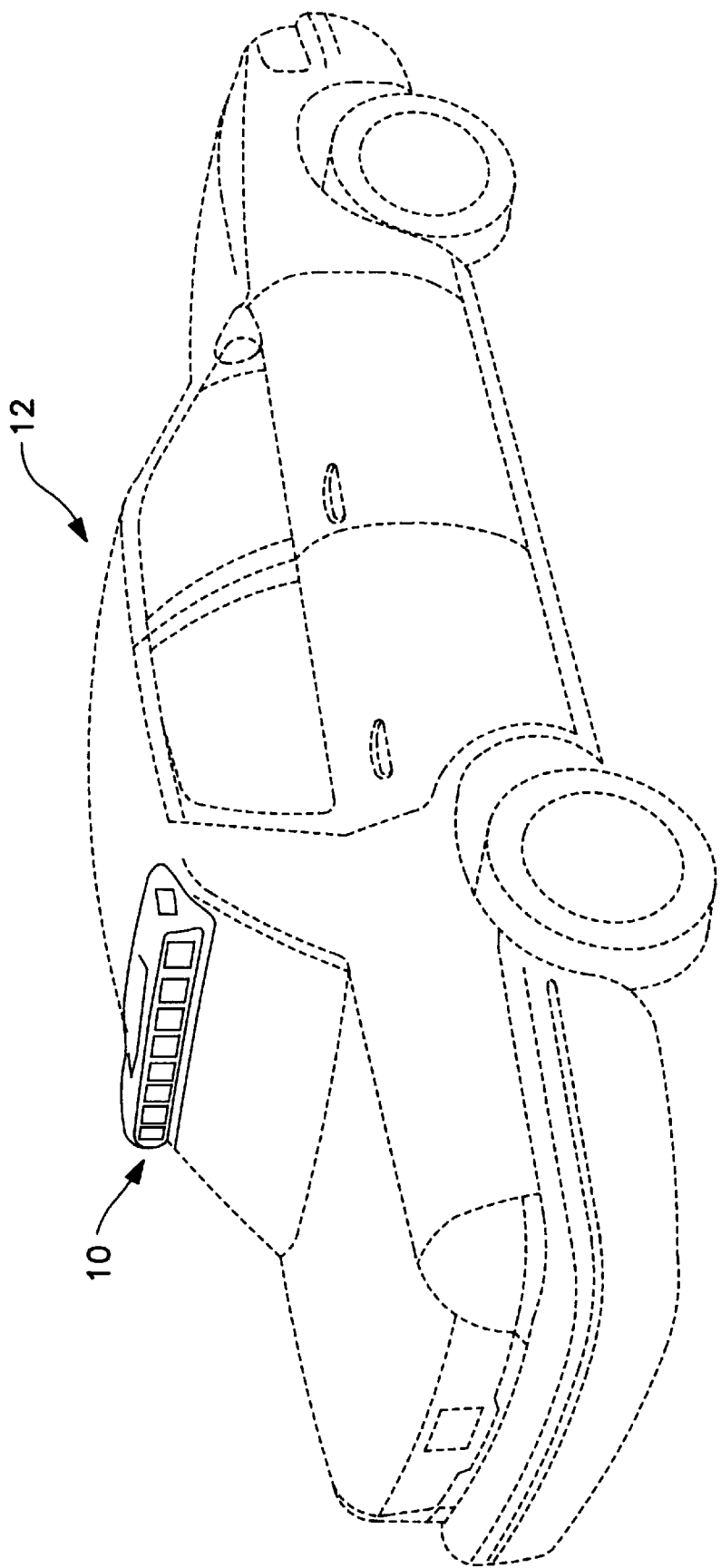
FIG. 1 is a perspective view of a light bar in accordance with the present invention mounted on a vehicle, the vehicle being shown in phantom.

Referring to the drawings, a light bar in accordance with the present invention is indicated generally at 10. As may be seen from FIG. 1, light bar 10 is mounted, in the manner to be described below, to a vehicle, indicated generally at 12, in a location where it preferably does not extend above the vehicle roof line, i.e., light bar 10 ideally does not increase the maximum height of vehicle 12. In the typical installation, as a consequence of the relatively shallow curvature of the roofs of the passenger compartments of most vehicles and the requirement that the vertical height of the trailing end of the light bar be sufficient to accommodate the warning lights, light bar 10 will extend part way over the rear window of vehicle 12. Light bar 10, accordingly, will be secured to both the vehicle roof and rear window. Light bar 10 is aerodynamically shaped, i.e., to the extent possible, the light bar comprises a smooth-surfaced rearward extension of the vehicle roof. Light bar 10 thus, in effect, functions as a "spoiler".

Light bar 10 comprises a housing 14 which is a unitary, molded plastic member. The overall shape of housing 14 will be varied slightly as a function of the use environment, i.e., the shape of housing 14 will be determined by the vehicle make and model on which it is to be installed. As noted above, housing 14, at its trailing edge, has sufficient height to receive warning lights such as the light heads indicated at 16 in FIGS. 1–3. The warning lights are, in the manner to be described below, affixed to a support member, i.e., a light trough 18, which is integrated with housing 14. The housing must be configured to receive and support light trough 18 such that, with the housing in place on the vehicle for which it is intended, the warning lights will be oriented so as to maximize visibility. The shape of housing 14, and thus that of light bar 10, is selected so as to not have a significant deleterious effect on the overall aerodynamics of the vehicle. Additionally, housing 14 is characterized by sufficient rigidity to be a self-supporting structure.

Figure 2:
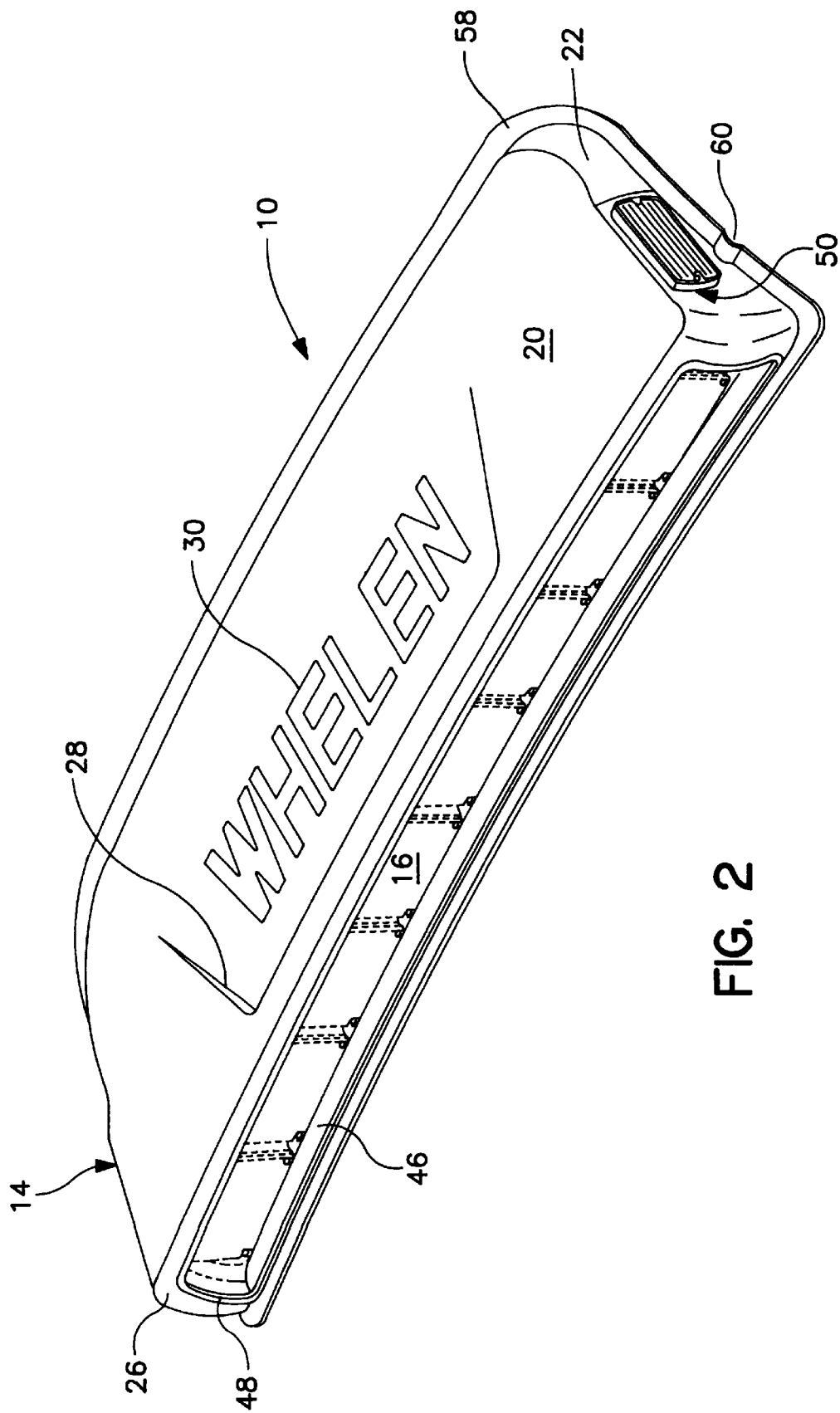
FIG. 2 is an enlarged perspective view of the light bar of FIG. 1.
Figure 3:
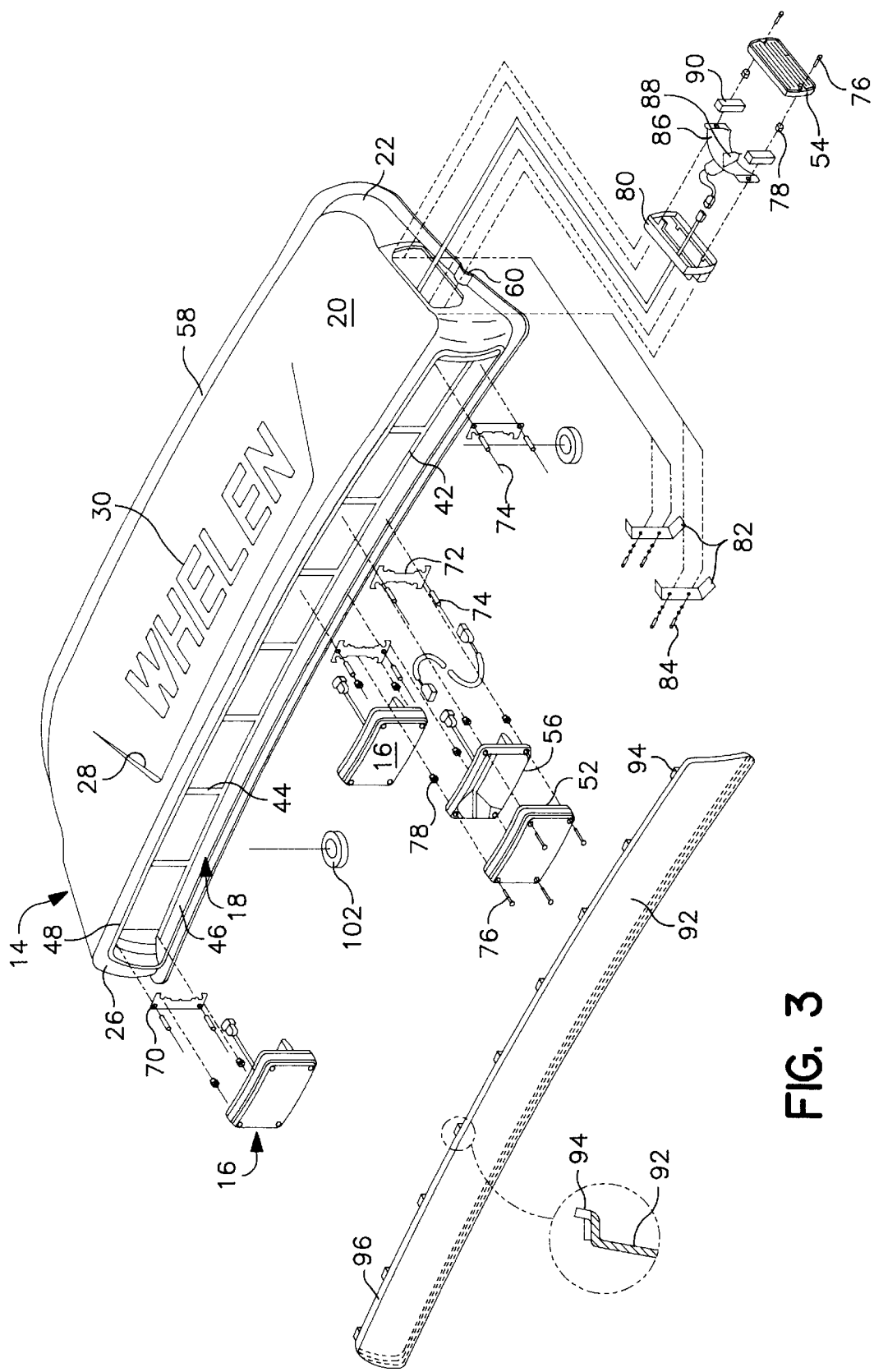
FIG. 3 is an exploded perspective view, with some of the components thereof omitted in order to facilitate understanding of the invention, of the light bar of FIGS. 1 and 2.
Figure 4:
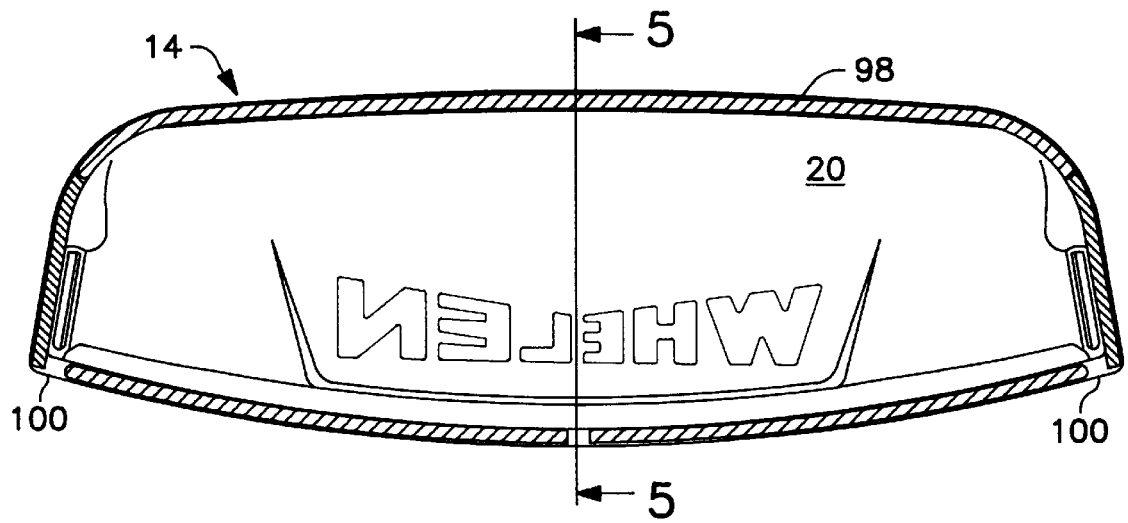
FIG. 4 is a bottom view of the light bar of FIGS. 1–3 without lights and other internal components installed therein.
Figure 5:
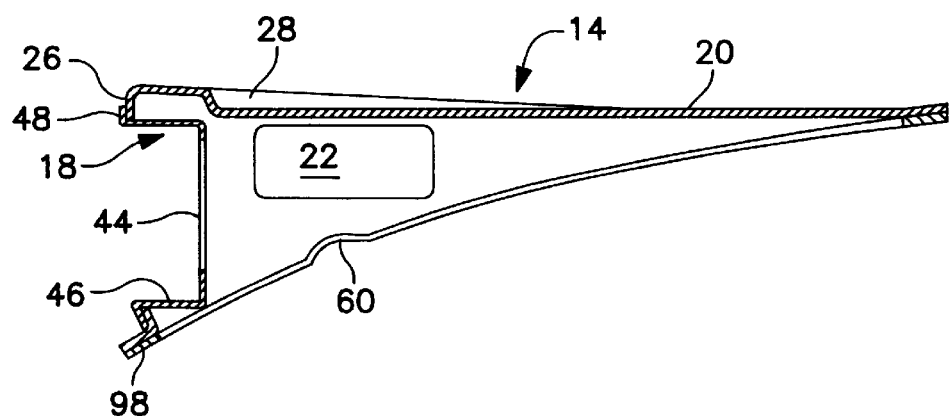
FIG. 5 is a cross-sectional, side elevation view of the housing of a light bar in accordance with the invention, FIG. 5 being a view taken along the line 5—5 of FIG. 4 and depicting the housing with the lens removed.

As best seen from FIGS. 3–5, a housing in accordance with the present invention essentially includes a top 20 which bridges a pair of generally triangular-shaped side walls 22. Housing 14 also has a rear wall 26 which defines a frame extending about a rearwardly facing, elongated opening. Housing 14 is thus essentially a four-sided unitary member which, when installed on a vehicle, does not have a bottom. Rigidity is imparted to housing 14 by incorporating, in top 20 thereof, downwardly extending ridges 28. In the disclosed embodiment, the ridges 28 cooperate to define a shallow depression in top 18. As shown in FIGS. 2–4, further stiffening of housing 14 may be accomplished by providing "embossed" lettering, as indicated at 30, within the bounds of the depression defined by ridges 28.

The elongated opening in rear wall 26 of housing 14 extends substantially the full width of the light bar and the perimeter of this opening, in effect, defines a plane. The light trough 18 is received in the opening in rear wall 26 and further increases the rigidity of the light bar. Trough 18 has a base comprising a rim portion 42 bridged by a plurality of integral spacers 44. The base of trough 18 thus is a lattice structure which defines an array of windows. This lattice, when trough 18 is integrated with housing 14 and the light bar is installed on a vehicle, is vertically oriented. The windows defined by spacers 44 and the portions of the rim 42 which are disposed at the opposite ends of the light trough are sized and shaped to receive the light heads 16. Light trough 18 also includes a continuous flange or side wall 46 which is oriented substantially transverse to base 42, 44. Side wall 46, viewed from the open side of trough 18, is complementary in shape to the elongated opening in rear wall 26 of housing 14. Side wall 46, at its outer edge, has a lip 48. As may be seen from FIG. 5, lip 48 is received in a recessed edge portion of rear wall 26 of housing 14, this recessed edge extending around the opening which receives trough 18.

In the disclosed embodiment, the light bar 10 supports a substantially linear array of eight light heads 16. Additionally, an alley light 50 is mounted in each of the side walls 22 of housing 14. The light heads 16, in the disclosed embodiment, employ linear gas discharge tubes as light generators, the tubes typically being filled with a gas mixture which includes xenon gas. Light heads 16 may, for example, be of the type disclosed in U.S. Pat. No. 4,792,717. The light heads 16, as will be recognized by those skilled in the art, may employ other types of light generators, such as incandescent lamps, particularly halogen lamps, metal halide high intensity discharge (HID) devices and LED arrays. Each of light heads 16 is provided with its own lens 52. Accordingly, the end user has the ability to select the color of the light emitted from each of light heads 16. The alley lights 50 will also each be provided with a lens 54.

Returning to a discussion of housing 14, the manufacture thereof comprises first producing a model in situ on a vehicle, the model being formed from a suitable modeling material such as clay. In the production of this model, care is taken to ensure that each of the light heads 16 will be vertically oriented, i.e., the plane defined by the front face of each of the reflectors 56 of the light heads 16 will lie in a vertically oriented plane or planes. The reflectors 56 will, of course, have focal points and these focal points will lie on optical axes and to the extent permitted by manufacturing tolerances, also lie in a common horizontal plane which is transverse to the said vertical plane(s). An impression will be made of the model, i.e., a form of plaster or the like will be produced, and this impression will then be utilized to produce a reusable metal mold in the customary manner. Housing 14 is subsequently thermally, i.e., vacuum, formed from a suitable plastic, ABS for example, in the mold. The completed housing is then painted.

Light trough 18 is also a thermal formed plastic part which preferably is comprised of the same material as housing 14. Trough 18, because of its shape, is inherently rigid.

In addition to the top and three side walls described above, housing 14 is provided with a mounting rim or flange 58 which, as best seen from FIGS. 2 and 5, includes a pair of oppositely disposed irregularities 60 which are sized and shaped to accommodate the gasket which extends about the vehicle rear window. The irregularities 60, of course, extend upwardly into the side walls 22 of housing 14. The irregularities 60 serve as locators during installation of the light bar on a vehicle.

Light bar 10 is assembled by first integrating the light trough 18 into housing 14. In so doing, the recessed edge portion of the frame which extends about the elongated opening in rear wall 26 is registered with the complementary shaped lip 48 of flange 46 of trough 18. The integration of light trough 18 and housing 14 is achieved by adhesive bonding.

After the light through 18 is integrated with housing 14, single and double metal brackets, respectively indicated at 70 and 72, are attached to the base of trough 18. The securing of brackets 70 and 72 to the lattice structure can conveniently be accomplished employing rivets 74 which pass through holes provided therefore in the brackets and in the bottom of the light trough, the rivets expanding behind the spacers 44. The light heads 16 are then removably mounted on the brackets 70, 72 by means of pan head sheet metal screws 76 which, behind the brackets, are engaged by screw grommets 78, the grommets being permanently locked into rectangular notches provided therefore in the brackets.

The alley lights 50 are received in openings provided therefore in side walls 22 of housing 14. Each of the alley lights has a concave housing 80 which includes a body portion sized to pass through the receiving opening in housing 14. The alley light housings 80 are also provided, about the periphery of the open side thereof, with an outwardly directed flange which defines a mounting surface larger than the opening in the housing. The alley lights are each secured to housing 14 by means of a pair of brackets 82 which engage the inside of housing 14, brackets 82 being connected to the body of housing 80 by means of screws 84. A seal is provided between the peripheral flange on housing 80 and the exterior of side wall 22 of housing 14, the seal being compressed when the screws 84 are installed. The alley lights 50 each further include a reflector 86 which cooperates with lens 54 and a light source 88 to produce a field of illumination which is biased in the direction of the front of vehicle 12. In the disclosed embodiment, the light source 88 in alley light 50 is a halogen lamp. The lens 54 is secured to housing 80 by means of pan head sheet metal screws 76 and cooperating screw grommets 78 as described above with respect to the light heads 16. Also in the disclosed embodiment, to achieve the spacing between lens 54 and reflector 86 which will achieve the desired field of illumination, spacers 90 are provided between the lens and the reflector.

In the light bar of the present invention, the depth of the light trough 18 results in the light heads 16 being recessed, in the direction of the front of the vehicle 12, from the plane defined by the perimeter of the elongated opening in rear wall 26 of housing 14. Thus, housing 14, particularly side wall 46 of light trough 18, performs the additional function of an awning which increases the visibility of the lights when energized.

In accordance with the invention, a one-piece lens 92, having a smooth exterior surface, covers the entire array of light heads 16. Lens 92 is provided with tabs 94 which engage slots provided therefore in flange 46 of light trough 18. As a final step in the assembly of the light bar, a gasket 96 is applied to lens 92 and the lens with the applied gasket is then snapped into position by engaging tabs 94 with the receiving slots in the flange 46. The gasket 96 establishes a watertight seal about the opening in rear wall 26 of light bar 10. Air flowing over the light bar will result in a region of low pressure being created immediately downstream of lens 92 and there will be a tendency for dirt to be drawn into this low pressure region. By providing a smooth surfaced lens 92, the light heads themselves will not become contaminated by this dirt and the visibility of the light bar will not be impaired because the lens may be simply and easily wiped clean.

Light bar 10 is secured in place on vehicle 12 by means of double faced adhesive tape positioned between flange 58 of housing 14 and the vehicle roof and rear window. As may be seen from FIG. 4, which represents housing 14 with tape 98 applied, three small gaps 100 are left at the trailing end of light bar 10 by discontinuities in tape 98. These gaps 100 function as water drains to allow any water which leaks into or condenses in housing 14 to drain out under the influence of gravity. Light bar 10, when installed in the manner described above, will be permanently affixed to vehicle 12. In order to permit electrical communication between the interior of light bar 10 and the means for controllably supplying power to the light heads and alley lights, one or more holes will be provided in the vehicle roof and grommet (s) 102 will be installed in these holes. Electrical cables will be passed through grommets 102 in a water-tight manner.

Servicing of an installed light bar 10, for example to replace a light generator in one of the light heads 16, simply requires removal of lens 92 followed by removal of the lens retaining screws from the light head which requires service.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A light bar for mounting on a motor vehicle, said light bar comprising:

a housing, said housing having a shape which generally forms a downstream extension of a portion of the roof of the vehicle on which the light bar is to be mounted, said housing including a top, said top having leading and trailing edges in the direction of air flowing over the roof of the vehicle when the vehicle is moving, said housing also including a pair of opposite side edges which extend between said leading and trailing edges, said leading edge being smooth and continuous between said side edges, said housing also having a pair of side walls which extend angularly from respective of said top side edges, said side walls tapering from a maximum height at their junction with said top trailing edge to a minimum height at said top leading edge, said housing further including a rear wall which extends between said side walls at said top trailing edge, said rear and side walls and said top being integral and cooperating to define therebetween a concavity which increases in depth from said top leading edge to said top trailing edge;

a single tier array of lights supported side-by-side from said housing rear wall, said lights extending into said concavity, said lights being supported such that visible radiation produced thereby will be directed rearwardly of the vehicle on which the light bar is mounted; and means for adhesively securing said housing top leading edge and the bottom edges of said side and rear walls to exterior surfaces of a motor vehicle, said side and rear wall bottom edges being oppositely disposed with respect to said side and trailing edges of said housing top.

2. The light bar of claim 1 wherein said housing rear wall comprises:

a frame which defines an elongated opening; and a trough defining member disposed in said opening and integral with said frame, said trough defining member having a base which defines a plurality of windows, said windows being sized and shaped to receive individual lights of said array, individual lights of said array being affixed to said base and positioned in respective of said windows.

3. The light bar of claim 1 wherein said housing rear wall includes an opening which is elongated, the perimeter of said opening defining a plane, and wherein said lights of said array are positioned in said opening and are located on the same side of said plane as said top trailing edge whereby said housing functions as an awning for said lights.

4. The light bar of claim 1 wherein said housing further comprises a mounting flange integral with said rear and side wall bottom edges and said top leading edge, said adhesive securing means being disposed between said mounting flange and the vehicle exterior surface.

5. The light bar of claim 1 further comprising:

a common lens extending over all of said lights of said array, said lens being affixed to said housing rear wall and having a smooth surface on the side thereof which faces in the direction in which light is radiated.

6. The light bar of claim 1 wherein said housing further comprises:

at least a first stiffening element integral with said housing top.

7. The light bar of claim 1 further comprising:

an opening in at least one of said side walls;

a flood light mounted in said opening in said one side wall, said flood light including a reflector, a light source and a lens, said reflector, light source and lens cooperating to provide a field of radiation which is angularly skewed in the direction of said housing top leading edge.

8. The light bar of claim 2 wherein the periphery of the opening in said frame defines a plane, and wherein said trough defining member has a side wall which extends outwardly from said base to said plane whereby said lights are recessed with respect to said plane and said trough side wall functions as an awning for said lights.

9. The light bar of claim 8 wherein said housing further comprises a mounting flange integral with said rear and side wall bottom edges and said top leading edge, said adhesive securing means being disposed between said mounting flange and the vehicle exterior surface.

10. The light bar of claim 8 further comprising:

a common lens extending over all of said lights of said array, said lens being affixed to said housing rear wall and having a smooth surface on the side thereof which faces in the direction in which light is radiated.

11. The light bar of claim 9 further comprising:

a common lens extending over all of said lights of said array, said lens being affixed to said housing rear wall and having a smooth surface on the side thereof which faces in the direction in which light is radiated.

12. The light bar of claim 8 further comprising:

an opening in at least one of said side walls;

a flood light mounted in said opening in said one side wall, said flood light including a reflector, a light source and a lens, said reflector, light source and lens cooperating to provide a field of radiation which is angularly skewed in the direction of said housing top leading edge.

13. The light bar of claim 11 further comprising:

an opening in at least one of said side walls;

a flood light mounted in said opening in said one side wall, said flood light including a reflector, a light source and a lens, said reflector, light source and lens cooperating to provide a field of radiation which is angularly skewed in the direction of said housing top leading edge.

14. The light bar of claim 10 wherein said lens is removably engaged with said trough defining member side wall.

15. The light bar of claim 13 wherein said lens is removably engaged with said trough defining member side wall.

16. The light bar of claim 1 wherein said array of lights comprise:

at least five warning lights, said warning lights each including:

a reflector, said reflector having an optical axis, a focal point and an outer perimeter which defines a plane;

a light generator, said light generator being positioned to intercept said focal point; and a lens, said lens cooperating with said reflector to define a space wherein said light generator being positioned in said space; and wherein said warning lights are supported from said housing rear wall with said focal points being substantially coplanar and lying approximately in a common horizontal plane, said reflector defined planes being oriented substantially vertically.

17. The light bar of claim 16 further comprising:

a common lens extending over all of said lights of said array, said lens being affixed to said housing rear wall and having a smooth surface on the side thereof which faces in the direction in which light is radiated.

18. The light bar of claim 17 wherein said housing rear wall comprises:

a frame which defines an elongated opening; and a trough defining member disposed in said opening and integral with said frame, said trough defining member having a base which defines a plurality of windows, said windows being sized and shaped to receive individual lights of said array, individual lights of said array being affixed to said base and positioned in respective of said windows.

19. The light bar of claim 18 wherein the periphery of the opening in said frame defines a plane, and wherein said trough defining member has a side wall which extends outwardly from said base to said plane whereby said lights are recessed with respect to said plane and said trough side wall functions as an awning for said lights.

20. The light bar of claim 19 further comprising:

an opening in at least one of said side walls;

a flood light mounted in said opening in said one side wall, said flood light including a reflector, a light source and a lens, said reflector, light source and lens cooperating to provide a field of radiation which is angularly skewed in the direction of said housing top leading edge.

21. The light bar of claim 1 wherein bottom edges of said side walls of said housing are each provided with a locating groove sized and shaped to receive a gasket which extends about the rear window of the vehicle.

22. The light bar of claim 20 wherein bottom edges of said side walls of said housing are each provided with a locating groove sized and shaped to receive a gasket which extends about the rear window of the vehicle.

* * * * *